United States Patent [19]

Clark, Jr.

[11] Patent Number: 5,124,376
[45] Date of Patent: Jun. 23, 1992

[54] USE OF PHENOL AS RAPID INVERSE LATEX INVERSION PROMOTER AND SOLUTION VISCOSITY ENHANCER

[75] Inventor: Earl Clark, Jr., Bartlesville, Okla.

[73] Assignee: Phillips Petroleum Company, Bartlesville, Okla.

[21] Appl. No.: 688,467

[22] Filed: Apr. 22, 1991

[51] Int. Cl.$^5$ .............................. C08J 3/07
[52] U.S. Cl. ................... 523/336; 523/337; 524/801; 528/495
[58] Field of Search ............. 523/337; 524/801, 311, 524/366; 528/495

[56] References Cited

U.S. PATENT DOCUMENTS

| | | | |
|---|---|---|---|
| Re. 28,474 | 7/1974 | Anderson et al. | 260/29.6 |
| Re. 28,576 | 10/1975 | Anderson et al. | 260/29.6 |
| 2,941,980 | 6/1960 | Robinson | 260/45.95 |
| 3,350,366 | 10/1967 | Merijan | 260/78 |
| 3,624,019 | 11/1971 | Anderson et al. | 260/29.6 |
| 3,734,873 | 5/1973 | Anderson et al. | 260/29.6 |
| 3,780,806 | 12/1973 | Bott | 166/275 |
| 3,852,234 | 12/1974 | Venema | 260/29.6 |
| 3,954,682 | 5/1976 | Fein et al. | 260/2.5 |
| 4,051,065 | 9/1977 | Venema | 252/359 |
| 4,147,681 | 4/1979 | Lim et al. | 260/29.6 |
| 4,240,505 | 12/1980 | Swanson | 166/302 |
| 4,252,706 | 2/1981 | Phillips et al. | 260/29.6 |
| 4,435,528 | 3/1984 | Domina | 523/332 |
| 4,753,981 | 6/1988 | Clark, Jr. | 524/801 |
| 4,764,574 | 8/1988 | Clark, Jr. et al. | 526/207 |
| 4,775,010 | 10/1988 | Clark, Jr. et al. | 166/307 |
| 4,906,701 | 3/1990 | Clark, Jr. et al. | 526/207 |
| 4,997,582 | 3/1991 | Clark, Jr. et al. | 252/8.553 |

FOREIGN PATENT DOCUMENTS 0126528 11/1988 European Pat. Off. .

OTHER PUBLICATIONS

Technical Bulletin No. 75430113 by GAF Corporation (1984) entitled in part PVP Polyvinylpyrrolidone, pp. 12 and 13.

Primary Examiner—Paul R. Michl
Assistant Examiner—Andrew E. C. Merriam
Attorney, Agent, or Firm—Laney, Dougherty, Hessin & Beavers

[57] ABSTRACT

A method of rapidly dissolving a water-soluble polymer into water. A water-in-oil latex having the polymer dispersed in the water phase thereof is added to the water. Phenol ($C_6H_5OH$) is added to the water in an amount sufficient to promote rapid inversion of the latex and release of the polymer into the water. When used in connection with certain latexes, phenol also functions to increase the viscosity of the water by as much as three times or more that achieved by complete inversion of the latex and release of the polymer into the water alone.

20 Claims, No Drawings

USE OF PHENOL AS RAPID INVERSE LATEX INVERSION PROMOTER AND SOLUTION VISCOSITY ENHANCER

BACKGROUND OF THE INVENTION

1. Field of the Invention

This invention relates to water-in-oil latexes having water-soluble polymers dispersed therein, and more particularly, to specific compounds for promoting inversion of such latexes in water to disperse the polymers into the water. In one embodiment, the invention relates to water-in-oil latexes and inversion promoters that function to increase the viscosity of the water to a point significantly higher than the viscosity achieved by complete inversion of the latex and release of the polymer into the water alone.

2. Description of the Prior Art

Due to their thickening and flocculating properties, water-soluble polymers have been developed for use in many applications. For example, water-soluble polymers are used as mobility control agents in enhanced oil recovery operations such as water flooding. Water-soluble polymers can significantly increase the viscosity of aqueous media when dissolved therein.

A problem encountered in many applications of water-soluble polymers is dissolution of the polymers into water at a sufficient rate. It is known in the art that water-soluble polymers can be rapidly dissolved into water by preparing a water-in-oil latex (often referred to as an inverse latex) having the polymer dispersed in the water phase thereof, and inverting the latex into the water whereby the polymer is released into the water as a solution. Both the polymer and the latex can be conveniently formed at the same time by inverse emulsion polymerization techniques. Until the latex is inverted, the polymer remains in the dispersed water phase and does not significantly affect the viscosity of the latex allowing the latex to be easily handled and transported. Because the polymer is formed of small droplets and is already in solution, it easily disperses into the water upon inversion of the latex into the water.

Most latexes can be inverted by dilution with a large quantity of water. Inversion promoters and other means can be employed to facilitate and increase the rate of the inversion. Latex inversion promoters used heretofore include water-soluble surfactants having a high hydrophilic/lipophilic balance (HLB).

Over the past few years, very stable water-in-oil latexes have been developed for use in applications involving hostile environments such as oil field applications in the North Sea. The high electrolyte concentration of sea water and/or high temperature encountered in such applications preclude the use of conventional latexes. Examples of water-in-oil latexes of water soluble polymers suitable for use in hostile environments and methods for preparing such latexes are described in U.S. Pat. Nos. 4,906,701, 4,764,574 and 4,753,981 issued to Clark, Jr.

Unfortunately, due to their high stability, many water-in-oil latexes such as those described in U.S. Pat. Nos. 4,906,701, 4,764,574 and 4,753,981 are difficult to rapidly invert. In many oil field and other applications, inversion of the latex and release of the polymer into the water in a very short period of time (within minutes) is critical. Although conventional inversion promoters such as high HLB surfactants can be employed, they do not always decrease the inversion time sufficiently.

SUMMARY OF THE INVENTION

By the present invention, it has been discovered that phenol ($C_6H_5OH$) promotes very rapid inversion of stable water-in-oil latexes, particularly such latexes of the type designed for use in hostile environments. When added to the water with the latex, phenol can reduce the time required for complete inversion and hydration from one and one-half hours or more to five minutes or less. In addition, it has been discovered that phenol also functions to further increase the viscosity of the aqueous media into which certain latexes are dissolved by as much as three times or more that achieved by complete inversion of the latex and release of the polymer into the aqueous media alone.

Accordingly, the present invention provides a method of rapidly dissolving a water-soluble polymer into water. The method comprises adding a water-in-oil latex having the polymer dispersed in the water phase thereof and a latex inversion promoter to the water. The latex inversion promoter is phenol and is added to the water in an amount sufficient to promote rapid inversion of the latex and release of the polymer into the water. The phenol is preferably added to the water in an amount of at least about 0.25% by weight, more preferably in an amount of from about 0.25% to about 10% by weight, based on the total weight of the latex, phenol and water. The water-soluble polymer is preferably formed from at least one ethylenically unsaturated monomer selected from acrylamide, methacrylamide, N-vinyl-2-pyrrolidone, acrylic acid, methacrylic acid, 2-acrylamido-2-methylpropanesulfonic acid, salts of acrylic acid, salts of methacrylic acid, salts of 2-acrylamido-2-methylpropanesulfonic acid, and mixtures thereof.

In one embodiment, the water-in-oil latex and the polymer are formed at the same time by an inverse emulsion polymerization process. At least one ethylenically unsaturated monomer, water, an organic liquid which is substantially immiscible with water, a water-in-oil emulsifier and a polymerization initiator are admixed, and the admixture is subjected to polymerization conditions sufficient to polymerize the monomer into a water-soluble polymer. The ethylenically unsaturated monomer can be selected from the group consisting of acrylamide, methacrylamide, N-vinyl-2-pyrrolidone, acrylic acid, methacrylic acid, 2-acrylamido-2-methylpropanesulfonic acid, salts of acrylic acid, salts of methacrylic acid, salts of 2-acrylamido-2-methylpropanesulfonic acid, and mixtures thereof.

In another embodiment, the water-in-oil latex having the water-soluble polymer dispersed in the water phase thereof comprises: (a) from about 50 to about 200 parts by weight water; (b) from about 60 to about 150 parts by weight of an organic liquid which is substantially immiscible with water; (c) from about 1 to about 50 parts by weight of a water-in-oil emulsifying agent consisting of from about 0.5 to about 30 parts by weight mono- and diglycerides of fat forming acids and from about 0.5 to about 30 parts by weight of polyoxyethylene (5) sorbitan hexaoleate; and (d) from about 70 to about 150 parts by weight of the polymer, the polymer being a terpolymer formed from a group of monomers consisting of about 5 to about 50 parts by weight N-vinyl-2-pyrrolidone, about 5 to about 50 parts by weight acrylamide and about 25 to about 90 parts by weight of the sodium salt of 2-acrylamido-2-methylpropanesulfonic acid. When phenol is added to the water with this water-in-oil latex in an amount of at least about 0.75% by weight based on the total weight of the latex, phenol and water, it functions not only to cause rapid inversion of the latex and release of the polymer into the water, but also to increase the viscosity of the water to a point significantly higher than the viscosity achieved by complete inversion of the latex and release of the polymer into the water alone.

It is, therefore, a principal object of the invention to provide an inversion promoter that causes rapid and complete inversion of very stable water-in-oil latexes of the type designed for use in hostile environments and release of the polymer into water.

It is also a principal object of the present invention to provide an inversion promoter that also further increases the viscosity of the water when used in association with certain latexes.

Numerous other objects, features and advantages of the present invention will be readily apparent to those skilled in the art upon a reading of the following disclosure including the examples provided therewith.

DESCRIPTION OF THE PREFERRED EMBODIMENTS

The present invention provides a method of rapidly dissolving a water-soluble polymer into water (any aqueous media). The method comprises the steps of preparing a water-in-oil latex having the polymer dispersed in the water phase thereof, and adding the latex and a latex inversion promoter to the water. The method is particularly suitable for use in connection with water-soluble polymers and very stable water-in-oil latexes containing such polymers designed for use in hostile environments, i.e., environments associated with high temperatures, sea water, harsh chemicals and the like. One embodiment of the method is very suitable for use in applications that require an increase in the viscosity of the water to a point beyond that which can be achieved by complete inversion of the latex and release of the polymer into the water alone.

The Polymer Containing Water In Oil Latex

Although the invention is particularly suitable for use in connection with polymers designed for use in hostile environments such as HE® polymers sold by Phillips 66 Company, any polymer formed from one or more ethylenically unsaturated monomers capable of forming water-soluble polymers can be used in the water-in-oil latex employed in the inventive method. As used herein and in the appended claims, the term "water-soluble polymer" means a polymer which is soluble in water in an amount of at least 1% by weight. Examples of polymers that can be employed are polymers formed from acrylamides, methacrylamides, acrylic acid and its salts, methacrylic acid and its salts, maleic acid and its salts, methyl acrylate, ethyl acrylate, propyl acrylate, methyl methacrylate, ethyl methacrylate, dimethylaminoethyl acrylate, dimethylaminoethyl methacrylate, diethylaminoethyl acrylate, diethylaminoethyl methacrylate, hydroxyethyl acrylate, hydroxyethyl methacrylate, styrene, acrylonitrile, 2-acrylamido-2-methylpropanesulfonicacid and its salts, 3-(methylacrylamido)propyltrimethylammonium chloride, vinyl methyl ether, vinyl ethyl ether, alkali metal and ammonium salts of vinyl sulfonic acid, vinyl pyridine, N-vinyl-2-pyrrolidone, vinyl imidazole, diallyl dimethylammonium chloride and the like. Homopolymers, copolymers, terpolymers and tetrapolymers, etc. can be employed.

Preferably, the polymer contained in the water-in-oil latex is formed from at least one ethylenically unsaturated monomer selected from the group consisting of acrylamide, methacrylamide, N-vinyl-2-pyrrolidone, acrylic acid, methacrylicacid, 2-acrylamido-2-methylpropanesulfonicacid, salts of acrylic acid, salts of methacrylic acid, salts of 2-acrylamido-2-methylpropanesulfonic acid, and mixtures thereof. Generally, polymers formed from monomers having appreciable water solubility will be more soluble in water. More preferably, the polymer contained in the inventive latex is formed from acrylic acid, acrylamide, N-vinyl-2-pyrrolidone, the sodium salt of 2-acrylamido-2-methylpropanesulfonic acid, and mixtures of any two or more of this group. Polymers formed of these monomers are particularly suitable for use in hostile environments. For example, such polymers can maintain viscosity of sea water solutions at 250° F. for very long periods of time.

Examples of polymers very suitable for use in the water-in-oil latex employed in the inventive method are HE® polymers sold by Phillips 66 Company. An example of a polymer very suitable for use in latexes designed for use in profile modification is a tetrapolymer formed of 30 parts by weight N-vinyl-2-pyrrolidone, 10 parts by weight acrylamide, 5 parts by weight acrylic acid and 55 parts by weight of the sodium salt of 2-acrylamido-2-methylpropanesulfonic acid per 100 parts by weight of the mixture.

The polymer preferably comprises in the range of from about 5% to about 75% by weight, more preferably in the range of from about 20% to about 50% by weight of the latex, based on the total weight of the latex.

The oil used to form the oil phase of the water-in-oil latex employed in the inventive method can be any suitable inert organic liquid which is substantially immiscible with water. Preferably, the organic liquid consists of at least one liquid hydrocarbon, more preferably, at least one liquid paraffinic and/or isoparaffinic hydrocarbon. An example of a very suitable hydrocarbon for use as the oil is sold by Phillips 66 Company under the trademark "SOLTROL® 145". The oil preferably comprises in the range of from about 60% to about 120% by weight, more preferably in the range of from about 80% to about 100% by weight, based on the weight of the polymer, of the latex.

The water forming the water phase of the water-in-oil latex employed in the inventive method preferably comprises in the range of from about 50% to about 200% by weight, more preferably in the range of from about 80% to about 120% by weight, based on the weight of the polymer, of the latex.

The emulsifying agent used to form the water-in-oil latex can be any emulsifying agent or mixture of emulsifying agents known to those skilled in the art to be useful as a water-in-oil emulsifying agent. It is important for the emulsifying agent to be of the right chemical type and to have a proper HLB. The emulsifying agent employed preferably has an HLB number in the range of from about 3 to about 9, more preferably about 7 to about 9. Most preferably, the emulsifying agent has an HLB number of about 8. As used herein and in the appended claims, HLB number means the number of the hydrophilic/lipophilic balance of the emulsifying agent as defined in the publication "The Atlas HLB System", 4th printing, Atlas Chemical Industries, Inc.

(1963). An example of a preferred emulsifying agent is a mixture of emulsifying agents consisting of sorbitan monooleate ("SPAN 80"), polyoxyethylene (20) sorbitan trioleate ("TWEEN 85") and polyoxyethylene (4) cetyl/stearyl alcohol ("SIPONIC E-2"). Another preferred mixture consists of mono- and diglycerides of fat forming acids ("ATMOS 300" from ICI Americas, Inc.) and polyoxyethylene (5) sorbitan hexaoleate ("G-1096" from ICI Americas, Inc.). Other suitable emulsifying agent mixtures are disclosed in U.S. Pat. Nos. 4,764,574 and 4,906,701. The amount of emulsifying agent employed is preferably in the range of from about 1% to about 15% by weight, more preferably in the range of from about 3% to about 10% by weight, based on the total weight of the polymer, water, organic liquid and other components employed.

The water-in-oil latex preferably comprises about 50 to about 200 parts by weight water, from about 60 to about 150 parts by weight of an organic liquid which is substantially immiscible with water, from about 1 to about 50 parts by weight of a water-in-oil emulsifying agent and from about 60 to about 150 parts by weight of the water-soluble polymer. More preferably, the water-in-oil latex comprises about 80 to about 120 parts by weight water, from about 80 to about 100 parts by weight of an organic liquid which is substantially immiscible with water, from about 3 to about 30 parts by weight of a water-in-oil emulsifying agent and from about 80 to about 120 parts by weight of the water-soluble polymer.

Preferably, the water-soluble polymer and water-in-oil latex employed in the inventive method are prepared at the same time by an inverse emulsion polymerization process. Inverse emulsion polymerization processes are well suited to the preparation of high molecular weight polymers at rapid polymerization rates. Examples of inverse emulsion polymerization processes and water-in-oil latexes very suitable for use in connection with the method of the present invention are described in U.S. Pat. Nos. 4,764,574, 4,906,701 and 4,753,981 issued to Clark, Jr., patents assigned to the Assignee of the present application and fully incorporated by reference herein.

In carrying out the inverse emulsion polymerization process, a water-in-oil emulsion is first formed by admixing at least one ethylenically unsaturated monomer, water, an organic liquid which is substantially immiscible with water, a water-in-oil emulsifying agent and a polymerization initiator. The polymerization is then carried out and the water-in-oil emulsion transformed into a water-in-oil latex by subjecting the admixture to polymerization conditions sufficient to polymerize the monomer into a water-soluble polymer.

The monomer(s), organic liquid and emulsifying agent used in preparing the latex, including the monomer(s), organic liquid and emulsifying agent preferred and most preferred, are those discussed above in connection with the types of polymers and other latex components that can be used in the polymer containing water-in-oil latex in general. Preferably, the monomer(s) is employed in an amount such that the latex will contain in the range of from about 5% to about 75% by weight, more preferably in the range of from about 20% to about 50% by weight polymer, based on the total weight of the latex. The latex is typically used to form aqueous solutions containing in the range of from about 0.001% to about 10% by weight of the polymer. The organic liquid is preferably employed in an amount in the range of from about 60% to about 120% by weight, more preferably in the range of from about 80% to about 100% by weight, based on the weight of the monomer(s). The water is preferably employed in an amount in the range of from about 50% to about 200% by weight, more preferably in the range of from about 80% to about 120% by weight, based on the weight of the monomer(s). The emulsifying agent is preferably employed in an amount in the range of from about 1% to about 15% by weight, more preferably in the range of from about 3% to about 10% by weight, based on the total weight of the polymerization admixture, i.e., the total weight of the water, monomer(s), organic liquid, emulsifying agent, and polymerization initiator.

Any suitable polymerization initiator or mixture of polymerization initiators can be employed in forming the latex. Suitable initiators generally comprise compounds that generate free radical fragments which can initiate the polymerization of the ethylenically unsaturated monomer. Examples of suitable initiators include azo compounds, organic peroxides, inorganic persulfates, organic hydroperoxides and the known redox systems which typically comprise an organic hydroperoxide and a transition metal activator component which may also include complexing agents as well as a reductant component. Examples of suitable polymerization initiators include 2,2'-azobisisobutyronitrile, 2,2'-azobis(2,4'-dimethylvaleronitrile), 2,2'azo-bis(2-amidinopropane)-hydrochloride, 2-t-butylazo-2-cyano-4-methoxy-4-methylpentane, 2,2'-azobis(2,4-dimethyl-4-methoxy-valeronitrile), benzoyl peroxide, di-t-butyl peroxide, t-butyl peroxyacetate, cumene hydroperoxide, potassium persulfate, and p-menthane hydroperoxide. A particularly suitable polymerization initiator because of its effectiveness at low temperatures is p-menthane hydroperoxide activated by ferrous sulfate heptahydrate complexed with the tetrasodium salt of ethylenediaminetetraacetic acid an reduced by a sodium formaldehyde sulfoxylate component. The amount of polymerization initiator employed is preferably in the range of from about 0.0001% to about 1% by weight, more preferably in the range of from about 0.0005% to about 0.5% by weight, based on the weight of the total polymerization admixture.

If desired, a chain transfer agent can be employed in the polymerization admixture to provide a means of reducing the molecular weight of the polymer produced therein. For certain applications, water-in-oil latexes comprising water-soluble polymers of reduced molecular weight are more suitable than the high molecular weight latexes. Preferably, the chain transfer agent is a thiol compound, more preferably a thiol compound represented by the general formula $HS-Y(Z)_x$ wherein Y is a hydrocarbyl radical having 2–5 carbon atoms and a valence of $x+1$; Z is selected from the group consisting of —OH, —CO$_2$H and —CO$_2$R wherein R is an alkyl radical of 1–3 carbon atoms; x is an integer of 1 or 2; and wherein the total number of carbon atoms per molecule of said thiol is 2–7. Examples of suitable preferred thiol compounds include 2-mercaptoethanol, mercaptoacetic acid, methyl 3-mercaptopropionate, 3-mercaptopropionic acid, and 3-mercapto-1-propanol, 3-mercapto-1-2-propanediol, mercaptosuccinic acid, propyl mercaptoacetate, ethyl mercaptoacetate, methyl mercaptoacetate, and dimethyl 2-mercaptomalonate. When used, the thiol compound is preferably employed in an amount in the range of from about 0.00007% to about 0.07% by weight, more preferably in the range of from about 0.00009% to about 0.05% by weight, and most preferably in the range of from about 0.00013% to about 0.03% by weight, based on the weight of the total polymerization admixture.

The components can be conveniently admixed by adding the water-in-oil emulsifying agent to the organic liquid to form a first mixture, adding the monomer(s) to water to form a second mixture, combining the first and second mixtures, adding any chain transfer agent and-/or other component employed and then adding the polymerization initiator. The total admixture preferably comprises from about 50 to about 200, more preferably about 80 to about 120, parts by weight water, from about 60 to about 150, more preferably about 80 to about 100 parts by weight of the organic liquid, from about 1 to about 50, more preferably about 3 to about 30, parts by weight of the emulsifying agent, from about 60 to about 150, more preferably about 80 to about 120, parts by weight of the monomer(s), and from about 0.0001 to about 1, more preferably about 0.0005 to about 0.5, parts by weight of the polymerization initiator. Once the components are admixed, the polymerization can be carried out.

In carrying out the polymerization, the temperature employed is preferably in the range of from about −20° C. to about 200° C., more preferably in the range of from about −5° C. to about 100° C. The time employed for the polymerization is preferably in the range of from about 0.5 to about 72 hours, more preferably in the range of from about 1 to about 24 hours. Suitable agitation should be employed as needed. The equipment utilized for the polymerization can simply be standard reactors such as those used for oil-in-water emulsion polymerizations.

After the polymerization has run its desired course a shortstop such as "Thiostop N" may be added. "Thiostop N" is a 40% sodium dimethyl dithio carbamate solution. It is preferably used in an amount in the range of from about 0.2% to 0.8% by weight, more preferably about 0.4% by weight, based on the weight of the monomer(s).

Inverse emulsion polymerization processes such as the process described above can be used to prepare water-in-oil latexes having long-term stability. Polymers having molecular weights anywhere from 1000 to 25,000,000 can be prepared. As used herein, molecular weight refers to a weight average molecular weight which can be determined according to methods which are well known in the art such as light scattering. For such molecular weight determinations it is only necessary that the polymer be recovered from the water-in-oil latex made according to the process of this invention and purified as needed prior to being subjected to the molecular weight determination procedures.

The Inversion Promoter

Due to their high stability, the above-described latexes can often only be inverted by using special inversion promoters. The latexes generally require a minimum of 1.5 hours to completely invert, even in the presence of conventional high HLB inversion promoters (water-soluble surfactants).

The inventive inversion promoter is phenol (C$_6$H$_5$OH), also referred to as carbolic acid, phenylic acid and hydroxybenzene. Phenol is a water-soluble compound represented by the structural formula:

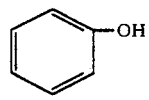

When present in the water (any aqueous media) with the latex, phenol promotes rapid inversion of the latex and release of the polymer into the water.

Typically, only a small amount of phenol is required. The phenol should be employed in an amount at least sufficient to promote complete inversion of the latex and release of the polymer into the water in a short amount of time. Preferably, the phenol is added to the water in an amount of at least about 0.25% by weight, more preferably in an amount in the range of from about 0.25% to about 10% by weight, even more preferably from about 0.5% to about 2% by weight, based on the total weight of the latex, phenol and water. Most preferably, the phenol is added to the water in an amount of about 1% by weight based on the total weight of the latex, phenol and water.

The phenol can be added to the water prior to, simultaneously with or after the water-in-oil latex is added to the water. The phenol, latex and water should be agitated in some way if possible.

Enhanced Viscosity With Phenol

Surprisingly, when used in an amount of at least about 0.75% by weight based on the total weight of the latex, phenol and water, phenol also functions to significantly further increase the viscosity of the water into which certain latexes are dissolved. The latexes for which this phenomena occurs comprise: (a) from about 50 to about 200 parts by weight water; (b) from about 60 to about 150 parts by weight of an organic liquid which is substantially immiscible with water; (c) from about 1 to about 50 parts by weight of a water-in-oil emulsifying agent consisting of from about 0.5 to about 30 parts by weight mono- and diglycerides of fat forming acids (e.g., "ATMOS 300") and from about 0.5 to about 30 parts by weight polyoxyethylene (5) sorbitan hexaoleate (e.g., "G-1096"); and (d) from about 70 to about 150 parts by weight of the polymer, the polymer being a terpolymer formed from a group of monomers consisting of about 5 to about 50 parts by weight N-vinyl-2-pyrrolidone, about 5 to about 50 parts by weight acrylamide and about 25 to about 90 parts by weight of the sodium salt of 2-acrylamido-2-methylpropanesulfonic acid.

The water-in-oil emulsifying agent employed in the latexes associated with this embodiment preferably has an HLB number in the range of about 7 to about 9. The emulsifying agent preferably consists of 10.2 parts by weight mono- and diglycerides of fat forming acids (e.g., "ATMOS 300") and 9.8 parts by weight polyoxyethylene (5) sorbitan hexaoleate (e.g., "G-1096"). This mixture of emulsifying agents has an HLB number of about 8. The terpolymer employed in the latex of this embodiment is preferably formed from a group of monomers consisting of about 15 to about 40, more preferably about 30, parts by weight N-vinyl-2-pyrrolidone, about 10 to about 30, more preferably about 15, parts by weight acrylamide and about 30 to about 75, more preferably about 55, parts by weight of the sodium salt of 2-acrylamido-2-methylpropanesulfonic acid. As shown by the Example below, phenol causes rapid inversion of such a latex and release of the polymer into the water and also further increases the viscosity of the water by over three times that expected, i.e., by over three times that which would be achieved by the polymer alone upon complete inversion of the latex. In this embodiment, the phenol is preferably added to the water in an amount in the range of from about 0.75% to about 10% by weight, more preferably from about 1% to about 5% by weight, based on the total weight of the latex, phenol and water. Most preferably, in this embodiment phenol is added to the water in an amount of about 1.14% by weight based on the total weight of the latex, phenol and water.

The additional increase in viscosity achieved by this embodiment of the method can be very beneficial in many applications. For example, phenol can be used to invert a latex such as a latex described above to provide polymer in a water flooding operation. The synergistic increase in viscosity decreases both the amount of polymer and inversion promoter required and, in some cases, makes it possible to achieve a viscosity that cannot be achieved by other means.

As with the inventive method in general, the latexes and terpolymers employed in this embodiment of the method are preferably formed at the same time by an inverse polymerization process such as described above.

In order to illustrate a further understanding of the method of the present invention, the following Example is given. Although the Example is presented to illustrate certain specific embodiments of the invention, it is not to be construed as to be restrictive of the scope and spirit thereof.

EXAMPLE

Phenol was tested for its effectiveness in promoting inversion of different types of highly stable water-in-oil latexes designed for use in applications involving hostile environments.

The latexes used in the tests each comprised N-vinyl-2-pyrrolidone (VP), acrylamide (AM) and/or the sodium salt of 2-acrylamido-2-methylpropanesulfonic acid (NaAMPS) and were prepared by an inverse emulsion polymerization process. The organic liquid used to form the oil phase of each latex was "SOLTROL® 145", an iso-paraffinic liquid hydrocarbon available from Phillips 66 Company. The emulsifying agent used to form each latex was either a mixture of sorbitan monooleate ("SPAN 80"), polyoxyethylene (20) sorbitan trioleate ("TWEEN 85") and polyoxyethylene (4) cetyl/stearyl alcohol ("SIPONIC E-2"), or a mixture of mono- and diglycerides of fat forming acids ("ATMOS 300" from ICI Americas, Inc.) and polyoxyethylene (5) sorbitan hexaoleate ("G-1096" from ICI Americas, Inc). The polymerization initiator employed was a redox initiator system composed of p-menthane hydroperoxide (PMHP) and activated by iron sulfate ($FeSO_4 \cdot 7H_2O$), sodium formaldehyde sulfoxylate (SFS) and ethylenediaminetetraacetic acid tetrasodium salt with 4 moles of water of hydration (Questex 4SW).

Each latex was prepared by first preparing a water-in-oil emulsion containing the monomers by mixing the monomers with water, sparging the monomer/water mixture with $N_2$ to eliminate oxygen, mixing the emulsifying agent components with the organic liquid, sparging the emulsifying agent/organic liquid mixture with $N_2$ and combining the mixtures in a 100 gallon commercial stirred tank polymerization reactor, and then carrying out the polymerization in the reactor. The recipes employed to prepare the emulsions used to form the latexes are shown below.

|  | Emulsions | | | | | | |
|---|---|---|---|---|---|---|---|
| Components | A | B | C | D | E | F | G |
|  | (Parts, by Weight) | | | | | | |
| Monomers/water/oil: | | | | | | | |
| VP[1] | 30 | 30 | 10 | 10 | 50 | 50 | 50 |
| AM[2] | 15 | 15 |  |  | 50 | 50 | 50 |
| NaAMPS[3] | 55 | 55 | 90 | 90 |  |  |  |
| Water | 90 | 120 | 100 | 90 | 120 | 80 | 80 |
| Organic Liquid[4] | 100 | 100 | 100 | 100 | 100 | 100 | 100 |
| Emulsifying Agent: | | | | | | | |
| SPAN 80[5] |  | 8.8 | 4.5 |  | 8.8 |  |  |
| TWEEN 85[6] |  | 11.2 | 5.5 |  | 11.2 |  |  |
| SIPONIC E-2[7] |  | 12 | 6 |  | 12 |  |  |
| Emulsifier: | | | | | | | |
| ATMOS 300[8] | 10.2 |  |  | 10.2 |  | 10.2 | 10.2 |
| G-1096[9] | 9.8 |  |  | 9.8 |  | 9.8 | 9.8 |
| Initiator: | | | | | | | |
| PMHP[10] | 0.054 | 0.054 | 0.054 | 0.054 | 0.054 | 0.054 | 0.054 |
| $FeSO_4 \cdot 7H_2O$ | 0.00001 | 0.00001 | 0.00001 | 0.00001 | 0.00001 | 0.00001 | 0.00001 |
| SFS[11] | 0.05 | 0.05 | 0.05 | 0.05 | 0.05 | 0.05 | 0.05 |
| Questex 4SW[12] | 0.00003 | 0.00003 | 0.00003 | 0.00003 | 0.00003 | 0.00003 | 0.00003 |

[1] N-vinyl-2-pyrrolidone.
[2] Acrylamide, charged as a 50 wt. % aqueous solution.
[3] The sodium salt of 2-acrylamido-2-methylpropanesulfonic acid, charged as a 50 wt. % aqueous solution.
[4] "Soltrol ® 145", an iso-paraffinic liquid hydrocarbon.
[5] Sorbitan monooleate.
[6] Polyoxyethylene (20) sorbitan trioleate.
[7] Polyoxyethylene (4) cetyl/stearyl alcohol.
[8] Mono- and diglycerides of fat forming fatty acids.
[9] Polyoxyethylene (5) sorbitan hexaoleate.
[10] p-menthane hydroperoxide.
[11] Sodium formaldehyde sulfoxylate.
[12] Ethylenediaminetetraacetic acid tetrasodium salt with 4 moles of water of hydration.

Each polymerization was carried out by pressuring the reactor with 5 psig $N_2$, cooling the reactants to 10° C. and then charging the polymerization initiator to the reactor. After an induction time of about 30 minutes, the temperature in the reactor peaked at 26° C. and then decreased back to 10° C. where it was maintained for 19 hours. At the end of the 19 hours, the polymerization was complete. The inherent viscosities of synthetic ocean water (SOW) solutions having the resulting water-in-oil latexes dissolved therein were then determined. Each inherent viscosity test was carried out by measuring the inherent viscosity of a SOW solution having an amount of the corresponding latex dissolved therein sufficient to make a 0.25 weight percent polymer solution (assuming complete monomer conversion) with a Cannon-Fenske viscometer at 25° C. In addition, each water-in-oil latex was analyzed for percent by weight residual N-vinyl-2-pyrrolidone (VP) and acrylamide (AM) by gas chromatography. The results of these tests are shown below.

between viscosity measurements with an Eberbach shaker at approximately 150 shakes per minute.

The results of the tests are shown in Table I below.

TABLE I

Effect of Phenol on Different Highly Stable Latexes

| Latex* | Amt. of Phenol (Wt. %)** | Minutes |||||||| 
|---|---|---|---|---|---|---|---|---|---|
| | | 5 | 10 | 15 | 20 | 30 | 45 | 60 | 120 |
| | | Viscosity (Centipoise) |||||||| 
| A | none (control) | | | | | 68 | | 149 | 163.5 |
| A | .57 | 58 | 88.5 | | | 118.5 | 148.5 | 164 | |
| A | 1.14 | | | 411 | | 464.5 | 500+ | | |
| A | 1.14 | 392 | | | | | | | |
| B** | 1.0 | | 10 | | | 26 | | 62.5 | |
| C** | 1.14 | 6.5 | | 38.5 | | 54.5 | 69 | 77.5 | |
| D** | 1.0 | | 23 | | | 51 | | 64 | |
| E** | 1.0 | | | | 42 | 44.5 | 55 | 67 | |
| F** | 1.0 | | | | | 53.5 | 43 | 48.5 | |
| G** | 1.0 | | | | 48 | 40.5 | | 50 | |

*Corresponding to Emulsions A, B, C, D, E, F and G described in "Emulsion Recipies" Table and Latexes A, B, C, D, E, F and G described in "Analysis of Latexes" Table above.
**Data from control run with this latex not available.
**Based on total weight of latex, inversion promoter and water.

| Test | Latex* |||||||
|---|---|---|---|---|---|---|---|
| | A | B | C | D | E | F | G |
| Inherent Viscosity (in SOW) | 6.3 | 7.1 | 6.5 | 6.0 | 6.4 | 6.5 | 7.0 |
| Residual VP (wt. %) | 2.16 | —** | 0.26 | 0.1 | —** | 3.68 | 2.49 |
| Residual AM (wt. %) | 0 | —** | 0 | 0 | —** | 0 | 0 |

*Corresponding to Emulsions A, B, C, D, E, F and G described in "Emulsion Recipies" Table above.
**Data not available.

The effectiveness of phenol in decreasing the time required for the latexes to invert in SOW was then determined. In each test, the phenol was first admixed with the SOW. The amount of phenol employed in the tests varied. Approximately 3.1 grams of the latex were then admixed with the SOW and phenol to yield a SOW solution comprising approximately 1% by weight of the polymer, based on the total weight of the latex, inversion promoter and water, upon inversion of the latex.

The time required for the latexes to substantially completely invert was determined by periodically measuring the Brookfield viscosity of the test solutions using a LVT model viscometer, #1 spindle at 12 rpm starting immediately after all the components were admixed until either substantially complete inversion occurred or it became obvious that substantially complete inversion would not occur within two hours. It was determined that substantially complete inversion occurred when the viscosity became relatively high and stabilized. The test solutions were continuously shaken Table I shows that phenol effectively decreases the time for various highly stable latexes to invert in synthetic ocean water. In the test in which latex A and no phenol was employed, a viscosity of about 160 was achieved in 2 hours. Addition of phenol in an amount of 0.57 wt. % caused a substantial increase in the viscosity achieved with latex A in a short amount of time. Use of 1.14% by weight phenol caused a very substantial increase in the viscosity achieved with latex A, an increase in viscosity over three times that achieved by complete inversion of the latex alone. The extremely high viscosity achieved by inverting latex A with 1.14% by weight phenol occurred within five minutes. Although to a lesser extent, phenol also promoted rapid inversion of latexes B, C, D, E, F and G.

Finally, the effectiveness of phenol in decreasing the time for latex A to invert in SOW, as shown by Table I above, was compared to the effectiveness of various prior art commercial inversion promoters in decreasing the time for latex A to invert in SOW.

The effectiveness of the prior art commercial inversion promoters was determined in basically the same way the effectiveness of the phenol was determined. The inversion promoter being tested was first admixed with the SOW in an amount of 1.0% by weight based on the total weight of the latex, inversion promoter and water. Approximately 3.1 grams of the latex were then admixed with the SOW and inversion promoter to yield a SOW solution comprising approximately 1% by weight of the polymer, based on the total weight of the latex, inversion promoter and water, upon inversion of the latex. The time required for the latex to substantially completely invert was determined by periodically measuring the Brookfield viscosity as described above. The prior art inversion promoters tested were "Dowfax 3B2 (sodium n-decyl diphenyl oxide disulfonate, obtained from Dow Chemical Co.), Nal-Flo R-3000 (a commercially available product obtained from Nalco Chemical Co.), Cyanamid Activator 478 (a commercially available product obtained from American Cyanimide Co.), Saponified (Potassium) Fatty Acid (obtained from Proctor and Gamble), Sodium Dodecyl Sulfate (obtained from Eastman Organic Chemical, Inc.), Daxad 17 (sodium salt of polymerized alkyl naphthaline sulphonic acids obtained from W. R. Grace & Co.), Witco TRS-40 (petroleum sulfonate obtained from Witco Chemical Co.) and Sulfonated Castor Oil (obtained from Arkansas Co., Inc.).

As shown by Table I, in the absence of an inversion promoter, latex A took approximately 2 hours to substantially completely invert. Addition of phenol in an amount of about 0.57% by weight based on the total weight of the latex, phenol and water significantly decreased the time required for inversion to occur. Addition of phenol in an amount of 1.14% by weight based on the total weight of the latex, phenol and water caused substantially complete inversion to occur within 5 minutes and tripled the viscosity that could be achieved by complete inversion of the latex alone. Unlike phenol, none of the prior art commercial inversion promoters decreased the time required for latex A to substantially completely invert.

The preceding Example can be repeated with similar success by substituting the generically or specifically described reactants and/or operating conditions of this invention for those used in the Example.

Although certain preferred embodiments of the invention have been described for illustrative purposes, it will be appreciated that various modifications and innovations of the methods recited herein may be effected without departure from the basic principles which underlie the invention. Changes of this type are therefore deemed to lie within the scope of the invention except as may be necessarily limited by the appended claims and reasonable equivalents thereof.

What is claimed is:

1. A method of rapidly dissolving a water-soluble polymer into water comprising:
    adding a water-in-oil ,latex having said polymer dispersed in the water phase thereof and a latex inversion promoter to said water, said inversion promoter being phenol ($C_6H_5OH$) and being added to said water in an amount sufficient to promote rapid inversion of said latex and release of said polymer into said water.

2. The method of claim 1 wherein said water-soluble polymer is formed from at least one ethylenically unsaturated monomer selected from the group consisting of acrylamide, methacrylamide, N-vinyl-2-pyrrolidone, acrylic acid, methacrylicacid, 2-acrylamido-2-methylpropanesulfonicacid, salts of acrylic acid, salts of methacrylic acid, salts of 2-acrylamido-2-methylpropanesulfonic acid, and mixtures thereof.

3. The method of claim 2 wherein said polymer is formed from at least two monomers selected from the group of N-vinyl-2-pyrrolidone, acrylamide, acrylic acid and the sodium salt of 2-acrylamido-2-methylpropanesulfonic acid.

4. The method of claim 3 wherein said water-in-oil latex comprises from about 50 to about 200 parts by weight water, from about 60 to about 150 parts by weight of an organic liquid which is substantially immiscible with water, from about 1 to about 50 parts by weight of a water-in-oil emulsifying agent and from about 60 to about 150 parts by weight of said water-soluble polymer.

5. The method of claim 4 wherein said emulsifying agent is selected from the group consisting of a mixture of sorbitan monooleate, polyoxyethylene (20) sorbitan trioleate and polyoxyethylene (4) cetyl/stearyl alcohol or a mixture of mono- and diglycerides of fat forming acids and polyoxyethylene (5) sorbitan hexaoleate.

6. The method of claim 1 wherein said water-in-oil latex having said polymer dispersed in the water phase thereof is prepared by:
    admixing at least one ethylenically unsaturated monomer, water, an organic liquid which is substantially immiscible with water, a water-in-oil emulsifying agent and a polymerization initiator; and
    subjecting said admixture to polymerization conditions sufficient to polymerize said monomer into a water-soluble polymer.

7. The method of claim 6 wherein said monomer is selected from the group consisting of acrylamide, methacrylamide, N-vinyl-2-pyrrolidone, acrylic acid, methacrylic acid, 2-acrylamido-2-methylpropanesulfonic acid, salts of acrylic acid, salts of methacrylic acid, salts of 2-acrylamido-2-methylpropanesulfonic acid and mixtures thereof.

8. The method of claim 6 wherein a plurality of monomers are employed, said monomers consisting of at least two monomers selected from the group of N-vinyl-2-pyrrolidone, acrylamide, acrylic acid and the sodium salt of 2-acrylamido-2-methylpropanesulfonic acid.

9. The method of claim 6 wherein said emulsifying agent is selected from the group consisting of a mixture of sorbitan monooleate, polyoxyethylene (20) sorbitan trioleate and polyoxyethylene (4) cetyl/stearyl alcohol or a mixture of mono- and diglycerides of fat forming acids and polyoxyethylene (5) sorbitan hexaoleate.

10. The method of claim 1 wherein said phenol ($C_6H_5OH$) is added to said water in an amount of at least about 0.25% by weight based on the total weight of said latex, phenol ($C_6H_5OH$) and water.

11. The method of claim 1 wherein said phenol ($C_6H_5OH$) is added to said water in an amount in the range of from about 0.25% to about 10% by weight, based on the total weight of said latex, phenol ($C_6H_5OH$) and water.

12. The method of claim 1 wherein said phenol ($C_6H_5OH$) is added to said water in an amount of about 1% by weight based on the total weight of said latex, phenol ($C_6H_5OH$) and water.

13. A method of rapidly dissolving a water-soluble polymer into water and increasing the viscosity of the water to a point higher than that capable of being achieved by the polymer alone comprising:
    preparing a water-in-oil latex having said polymer dispersed in the water phase thereof, said latex including:
        from about 50 to about 200 parts by weight water;
        from about 60 to about 150 parts by weight of an organic liquid which is substantially immiscible with water;
        from about 1 to about 50 parts by weight of a water-in-oil emulsifying agent consisting of from about 0.5 to about 30 parts by weight of polyoxyethylene (5) sorbitan hexaoleate; and
        from about 70 to about 150 parts by weight of said polymer, said polymer being a terpolymer formed from a group of monomers consisting of about 5 to about 50 parts by weight N-vinyl-2-pyrrolidone, about 5 to about 50 parts by weight acrylamide and about 25 to about 90 parts by weight of the sodium salt of 2-acrylamido-2-methyl-propanesulfonic acid; and
    adding said latex and a latex inversion promoter to said water, said inversion promoter being phenol ($C_6H_5OH$) and being added to said water in an amount of at least 0.75% by weight based on the total weight of said latex, phenol ($C_6H_5OH$) and water.

14. The method of claim 13 wherein said water-in-oil emulsifying agent consists of about 10.2 parts by weight mono- and diglycerides of fat forming acids and about 9.8 parts by weight of polyoxyethylene (5) sorbitan hexaoleate, and said terpolymer is formed from a group of monomers consisting of about 15 to about 40 parts by weight N-vinyl-2-pyrrolidone, about 10 to about 30 parts by weight acrylamide and about 30 to about 75 parts by weight of the sodium salt of 2-acrylamido-2-methylpropanesulfonic acid.

15. The method of claim 14 wherein said terpolymer is formed from a group of monomers consisting of about 30 parts by weight N-vinyl-2-pyrrolidone, about 15 parts by weight acrylamide and about 55 parts by weight of the sodium salt of 2-acrylamido-2-methylpropanesulfonic acid.

16. The method of claim 13 wherein said water-in-oil latex having said polymer dispersed in the water phase thereof is prepared by:
    admixing said water, organic liquid, water-in-oil emulsifying agent and group of monomers forming said terpolymer with a polymerization initiator; and
    subjecting said admixture to polymerization conditions sufficient to polymerize said monomers into said terpolymer.

17. The method of claim 16 wherein said group of monomers forming said terpolymer consists of about 15 to about 40 parts by weight N-vinyl-2-pyrrolidone, about 10 to about 30 parts by weight acrylamide and about 30 to about 75 parts by weight of the sodium salt of 2-acrylamido-2-methylpropanesulfonic acid.

18. The method of claim 16 wherein said water-in-oil emulsifying agent consists of about 10.2 parts by weight mono- and diglycerides of fat forming acids and about 9.8 parts by weight of polyoxyethylene (5) sorbitan hexaoleate, and said group of monomers forming said terpolymer consist of about 30 parts by weight N-vinyl-2-pyrrolidone, about 15 parts by weight acrylamide and about 55 parts by weight of the sodium salt of 2-acrylamido-2-methylpropanesulfonic acid.

19. The method of claim 13 wherein said phenol ($C_6H_5OH$) is added to said water in an amount in the range of from about 0.75% to about 10% by weight based on the total weight of said latex, phenol ($C_6H_5OH$) and water.

20. The method of claim 13 wherein said phenol ($C_6H_5OH$) is added to said water in an amount in the range of from about 1% to about 5% by weight based on the total weight of said latex, phenol ($C_6H_5OH$) and water.

* * * * *